United States Patent
Miyazaki

(10) Patent No.: US 7,885,532 B2
(45) Date of Patent: Feb. 8, 2011

(54) IMAGE SENSING APPARATUS WITH PRE-FLASH AND IMAGE SENSING METHOD FOR CALCULATING FLASH ILLUMINATION AMOUNT USING DEGREE OF CONVERGENCE

(75) Inventor: Yasuyoshi Miyazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 280 days.

(21) Appl. No.: 12/026,728

(22) Filed: Feb. 6, 2008

(65) Prior Publication Data

US 2008/0193119 A1 Aug. 14, 2008

(30) Foreign Application Priority Data

Feb. 8, 2007 (JP) .............................. 2007-029711

(51) Int. Cl.
*G03B 15/03* (2006.01)
(52) U.S. Cl. ........................ 396/157; 396/161; 396/164
(58) Field of Classification Search ....................... None
See application file for complete search history.

(56) References Cited

U.S. PATENT DOCUMENTS

| | | | |
|---|---|---|---|
| 7,298,412 B2 | 11/2007 | Sannoh | |
| 7,636,123 B2 * | 12/2009 | Fukui | 348/370 |
| 7,676,148 B2 * | 3/2010 | Hosoi | 396/157 |
| 7,680,410 B2 * | 3/2010 | Nose et al. | 396/157 |
| 2006/0044422 A1 * | 3/2006 | Miyazaki | 348/234 |
| 2007/0146539 A1 * | 6/2007 | Kawahara et al. | 348/370 |
| 2007/0189752 A1 * | 8/2007 | Kobayashi | 396/157 |
| 2008/0074536 A1 * | 3/2008 | Tamura | 348/371 |
| 2008/0181597 A1 * | 7/2008 | Tamura | 396/164 |
| 2009/0073275 A1 * | 3/2009 | Awazu | 348/222.1 |

FOREIGN PATENT DOCUMENTS

| JP | 2003-107555 A | 9/2003 |
|---|---|---|
| JP | 2004-184508 A | 2/2004 |

* cited by examiner

*Primary Examiner*—W. B. Perkey
*Assistant Examiner*—Bret Adams
(74) *Attorney, Agent, or Firm*—Canon U.S.A., Inc. I.P. Division

(57) ABSTRACT

An image sensing method and image sensing apparatus, including a subject detection unit and a flash unit, are provided. The method includes a first detection step of detecting a subject from image data obtained during preparation for main image sensing, a second detection step of detecting a subject based on reflected light data obtained during pre-flash after an instruction to begin main image sensing, a step of setting a flash illumination area based on a comparison result between a first proportion of the subject detected in the first detection step within a subject area in which the subject exists and a second proportion of the subject detected in the second detection step within the subject area, a step of calculating a flash illumination amount based on the set flash illumination area, and a step of controlling the flash unit during main image sensing based on the calculated flash illumination amount.

6 Claims, 9 Drawing Sheets

IMAGE SENSING APPARATUS WITH PRE-FLASH AND IMAGE SENSING METHOD FOR CALCULATING FLASH ILLUMINATION AMOUNT USING DEGREE OF CONVERGENCE

BACKGROUND OF THE INVENTION

1. Field of the Invention

The present invention relates to an image sensing apparatus and an image sensing method, and more particularly, to an image sensing apparatus and an image sensing method capable of detecting a subject from a sensed image.

2. Description of the Related Art

Conventionally, in a digital camera, there is an image sensing apparatus equipped with an automatic exposure control function that determines exposure automatically based on image data obtained by image sensing. As photometric methods carried out for the purpose of such automatic exposure control, there is, for example, evaluative photometry carried out taking the entire frame into consideration, as well as multi-division photometry, in which a photometric area within the frame is divided into a plurality of blocks and photometry carried out in blocks. In addition to these methods, there is also center-weighted photometry, in which photometry is carried out with emphasis on the center portion of the frame, as well as spot photometry, in which photometry is carried out only for an arbitrary range of the center portion of the frame.

In addition, in order to get the luminance proper for a main subject, there are apparatuses in which the user specifies the area in which the main subject is present and the apparatus adjusts the exposure on the basis of the luminance of the specified area. Further, a camera that automatically detects, for example, a face as the main subject by a technique such as shape analysis from image data obtained by image sensing and carries out exposure control so that the detected face is properly exposed has been proposed (see, for example, JP-2003-107555-A). Such a camera brightens the entire frame if the face is underexposed and darkens the frame overall if the face is overexposed, even though the luminance of the frame overall is proper (see FIG. 7 of JP-2003-107555-A). Moreover, a camera has also been proposed that detects the face from an image obtained with a test flash and carries out exposure control so that the face area is correctly exposed even during flash image sensing (see, for example, JP-2004-184508-A).

However, with the methods disclosed in JP-2003-107555-A and JP-2004-184508-A, there are cases where it is not possible to control the flash illumination amount so that the luminance of the face is proper when conducting flash image sensing.

FIG. 9 shows an example in which it was not possible to control the flash illumination amount so that the luminance of the face is proper when conducting flash image sensing using a conventional two-stage shutter button.

Reference numeral 901 shown in FIG. 9 shows an instance in which, in an image obtained during pre-flash to determine the flash illumination amount, the face is overexposed and could not be detected. First, when the shutter button is depressed halfway (switch SW1 ON), a single image IM1P is sensed for exposure and focus control and the face is detected from the sensed image IM1P. If it is found that the face detected here is dark and the brightness needs to be adjusted with the flash, then when the shutter button is fully depressed (switch SW2 ON) a pre-flash is carried out prior to the main flash and a second image IM2P is sensed. In the second image IM2P, since the face is overexposed it cannot be detected. Consequently, the flash illumination amount that would give the face the correct luminance cannot be calculated, and as a result, the face in a third image IM3P obtained when the flash is fired in a main flash is too dark.

Reference numeral 902 shown in FIG. 9 shows an instance in which face detection is carried out in an image obtained when SW1 is turned ON and the face area is fixed at the detected area. First, a single image IM4P is sensed when switch SW1 is turned ON, the face is detected from the image IM4P, and the area of the detected face is fixed as the area used for all further control, including exposure control. If it is found that the face detected here is dark and the brightness needs to be adjusted using the flash, then when switch SW2 is turned ON a pre-flash is carried out prior to the main flash and an image IM5P is sensed. Assume here that after image IM4P is sensed but before image IM5P is sensed the image sensing angle changes and the face is no longer at the fixed face area. In that case, if the flash illumination amount is set based on the image signal from that fixed face area, then the face in an image IM6P obtained when the flash is fired in a main flash becomes too bright. The same problem arises whenever the subject moves.

SUMMARY OF THE INVENTION

The present invention has been made in consideration of the above situation, and an aspect thereof, is to control a flash illumination amount so that a face luminance is correct under a variety of different conditions.

According to an aspect of the present invention, an image sensing method is provided for an image sensing apparatus including a subject detection unit to detect a subject that satisfies a certain preset condition from image data obtained by image sensing with an image sensing element and a flash unit. The image sensing method includes a first detection step of detecting a subject with the subject detection unit from image data obtained by image sensing with the image sensing element during preparation for main image sensing; a second detection step of detecting a subject based on reflected light data obtained by image sensing with the image sensing element during pre-flash with the flash unit after an instruction to begin main image sensing; a flash illumination area setting step of setting a flash illumination area based on a comparison result between a first proportion that is a proportion of the subject detected in the first detection step within a subject area in which the subject exists and a second proportion that is a proportion of a subject part calculated based on the subject detected in the second detection step within the subject area; a calculation step of calculating a flash illumination amount for the flash unit based on image data of the flash illumination area set in the flash illumination area setting step; and a flash illumination control step of controlling the flash unit during main image sensing based on the flash illumination amount obtained in the calculation step.

According to another aspect of the present invention, an image sensing apparatus is provided which includes a subject detection unit configured to detect a subject that satisfies a certain preset condition from image data obtained by image sensing with an image sensing element, the subject detection unit including a first detection unit that detects a subject with the subject detection unit from image data obtained by image sensing with the image sensing element during preparation for main image sensing, a second detection unit that detects a subject on the basis of the reflected-light data obtained by image sensing with the image sensing element during pre-flash with the flash unit and a subject with the subject detection unit from image data obtained by image sensing with the image sensing element during pre-flash with the flash unit after an instruction to begin main image sensing, and a third detection unit that detects a subject with the subject detection unit from image data obtained by image sensing with the image sensing element without using the flash unit prior to the pre-flash after the instruction to begin main image sensing; a flash unit; a flash illumination area setting unit adapted to set a flash illumination area based on a detection result of the second detection step in a case where the subject is detected by the second detection unit, and setting a flash illumination area based on a comparison result between a first proportion that is a proportion of the subject detected by the first detection unit within a subject area in which the subject exists and a third proportion that is a proportion of a subject part calculated based on the subject detected by the second detection unit within the subject area; a calculation unit configured to calculate a flash illumination amount for the flash unit based on image data of the flash illumination area set by the flash illumination area setting unit; and a flash illumination controller configured to control the flash unit during main image sensing based on the flash illumination amount calculated by the calculation unit.

According to another aspect of the present invention, an image sensing method is provided for an image sensing apparatus including a subject detection unit to detect a subject that satisfies a certain preset condition from image data obtained by image sensing with an image sensing element and a flash unit. The image sensing method includes:

a first detection step of detecting a subject with the subject detection unit from image data obtained by image sensing with the image sensing element during preparation for main image sensing;

a second detection step of detecting a subject on the basis of the reflected-light data obtained by image sensing with the image sensing element during pre-flash with the flash unit and a subject with the subject detection unit from image data obtained by image sensing with the image sensing element during pre-flash with the flash unit after an instruction to begin main image sensing;

a third detection step of detecting a subject based on reflected light data obtained by image sensing with the image sensing element during pre-flash with the flash unit and a subject with the subject detection unit from image data obtained by image sensing with the image sensing element without using the flash unit prior to the pre-flash after the instruction to begin main image sensing;

a flash illumination area setting step of setting a flash illumination area based on a detection result with the subject detection unit of the second detection step in a case where the subject is detected with the subject detection unit in the second detection step, and setting a flash illumination area based on a comparison result between a first proportion that is a proportion of the subject detected in the first detection step within a subject area in which the subject exists and a third proportion that is a proportion of the subject detected in the second detection step within the subject area;

a calculation step of calculating a flash illumination amount for the flash unit based on image data of the flash illumination area set in the flash illumination area setting step; and a flash illumination control step of controlling the flash unit during main image sensing based on the flash illumination amount obtained in the calculation step.

According to still another aspect of the present invention, an image sensing apparatus is provided which includes:

a subject detection unit configured to detect a subject that satisfies a certain preset condition from image data obtained by image sensing with an image sensing element, the subject detection unit including a first detection unit that detects a subject with the subject detection unit from image data obtained by image sensing with the image sensing element during preparation for main image sensing, a second detection unit that detects a subject on the basis of the reflected-light data obtained by image sensing with the image sensing element during pre-flash with the flash unit and a subject with the subject detection unit from image data obtained by image sensing with the image sensing element during pre-flash with the flash unit after an instruction to begin main image sensing, and a third detection unit that detects a subject with the subject detection unit from image data obtained by image sensing with the image sensing element without using the flash unit prior to the pre-flash after the instruction to begin main image sensing;

a flash unit;

a flash illumination area setting unit adapted to set a flash illumination area based on a detection result by the subject detection unit of the second detection unit in a case where the subject is detected by the subject detection unit of the second detection unit, and setting a flash illumination area based on a comparison result between a first proportion that is a proportion of the subject detected by the first detection unit within a subject area in which the subject exists and a third proportion that is a proportion of the subject detected by the second detection unit within the subject area;

a calculation unit configured to calculate a flash illumination amount for the flash unit based on image data of the flash illumination area set by the flash illumination area setting unit; and a flash illumination controller configured to control the flash unit during main image sensing based on the flash illumination amount calculated by the calculation unit.

Further features and aspects of the present invention will become apparent from the following description of exemplary embodiments with reference to the Figures.

DESCRIPTION OF THE EMBODIMENT

Various embodiments of the present invention will be described in detail in accordance with the accompanying drawings.

Figure 1:
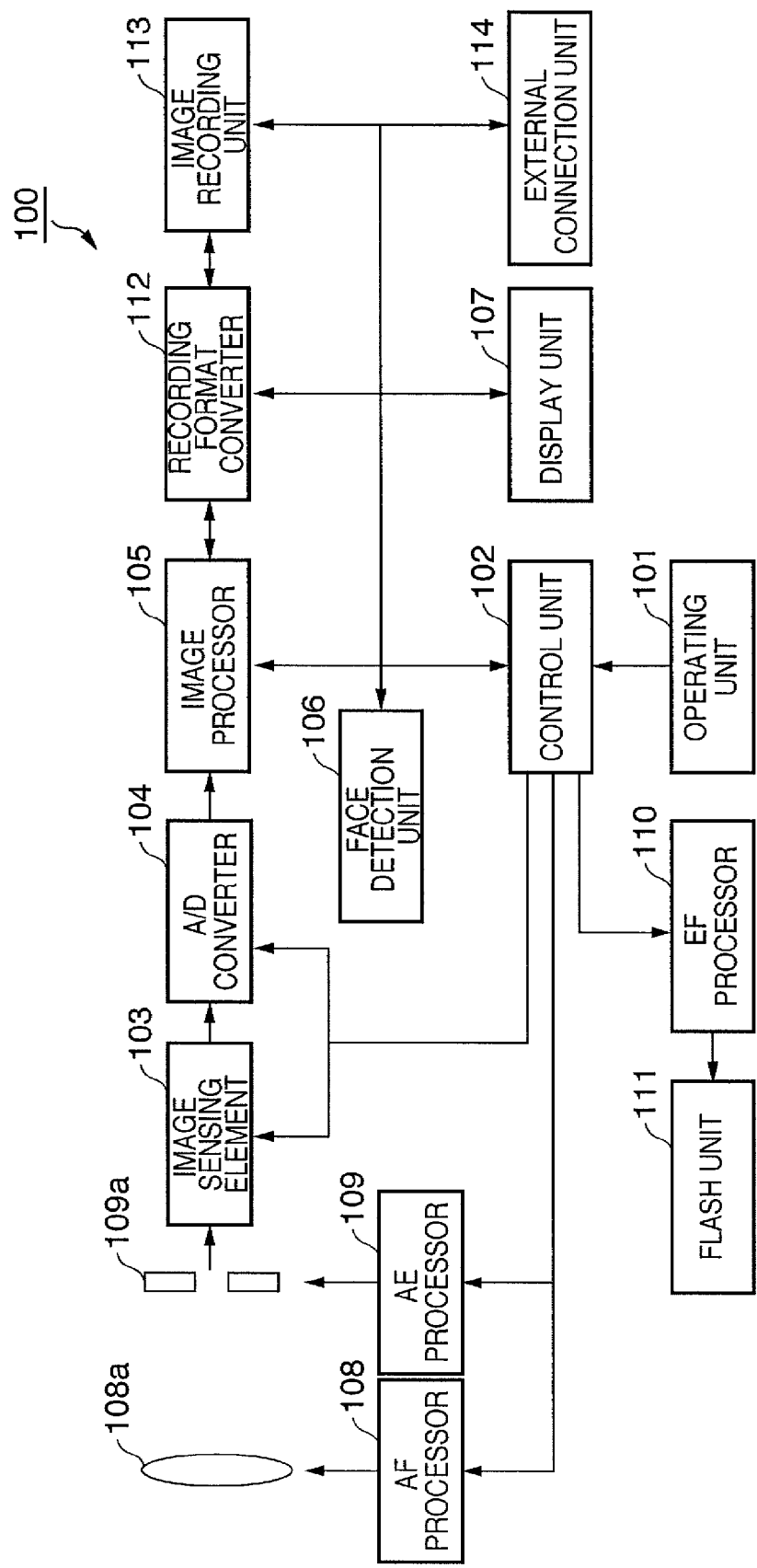
FIG. 1 is a block diagram showing schematically an example configuration of a digital camera of embodiments of the present invention.

In the present embodiments, a description is given of an arrangement in which a digital camera is used as an image sensing apparatus. FIG. 1 is a block diagram showing the functional configuration of a digital camera 100 according to the present embodiments.

Reference numeral 101 designates an operating unit, composed of switches, buttons and the like that an operator of the digital camera 100 manipulates to input a variety of instructions. A shutter button is also included in the operating unit 101. In a state in which the shutter button is depressed halfway, a switch SW1 that instructs image sensing preparation is turned ON and a control unit 102 is notified by the operating unit 101. When the shutter button is fully depressed, a switch SW2 is turned ON and the control unit 102 is notified by the operating unit 101.

Reference numeral 102 designates the control unit, which controls the operations of the various parts of the digital camera 100 shown in FIG. 1 and controls the components in response to instructions from the operating unit 101.

Reference numeral 103 designates an image sensing element, as typified by a CCD or a CMOS sensor, and 108a designates a lens. Although for convenience the lens 108a is shown as a single lens in FIG. 1, in reality, it is composed of a plurality of lenses including a focus lens. In addition, 109a designates an exposure mechanism, including a mechanical shutter. The image sensing element 103 receives light entering through the lens 108a and the exposure mechanism 109a and outputs an electrical charge that corresponds to the amount of light received.

An analog/digital (A/D) converter 104 performs sampling, gain adjustment, A/D conversion and the like on analog image signals output from the image sensing element 103 and outputs the processed results as digital image signals.

An image processor 105 performs various types of image processing on the digital image signals output from the A/D converter 104 and outputs processed digital image signals. For example, the image processor 105 converts digital image signals received from the A/D converter 104 into YUV image signals for output.

Reference numeral 106 designates a face detection unit, 108 designates an AF processor that adjusts the focus by controlling the focus lens of the lens 108a, and 109 designates an AE processor that controls exposure by controlling the exposure mechanism 109a.

The face detection unit 106 detects an area of a face of a person as a main subject from an image indicated by the digital image signals output from the image processor 105, and reports information pertaining to this area to the control unit 102. The control unit 102, when it receives this information, instructs the AF processor 108 to focus on the area of the face of the person detected in the image, and at the same time instructs the AE processor 109 to adjust the exposure of the area of the face of the person so that the exposure is proper. Based on an instruction from the control unit 102, the AF processor 108 adjusts the position of the focus lens included in the lens 108a, and at the same time the AE processor 109 adjusts the exposure mechanism 109a.

In addition, in the event that the control unit 102 determines that a flash is necessary, the control unit 102 instructs an EF processor 110 to turn the flash ON. The EF processor 110, when it receives a flash-ON instruction, controls a flash unit 111, causing it to fire.

A display unit 107 is composed of a small liquid crystal display screen or the like, and displays images in accordance with image data processed by the image processor 105.

A recording format converter 112 converts a recording format of the digital image signals (the image data) output from the image processor 105 to a recording format such as JPEG, and outputs it to an image recording unit 113. The image recording unit 113 carries out a process of recording the recording-format-converted image data received from the recording format converter 112 in a memory, not shown, in the digital camera 100, or in an external memory inserted in the digital camera 100.

An external connection unit 114 functions as an interface for connecting the digital camera 100 to an external device such as a personal computer (PC) or a printer.

First Exemplary Embodiment

Next, a description is given of the operation of a first embodiment of the digital camera 100 having the configuration described above.

Figure 2:
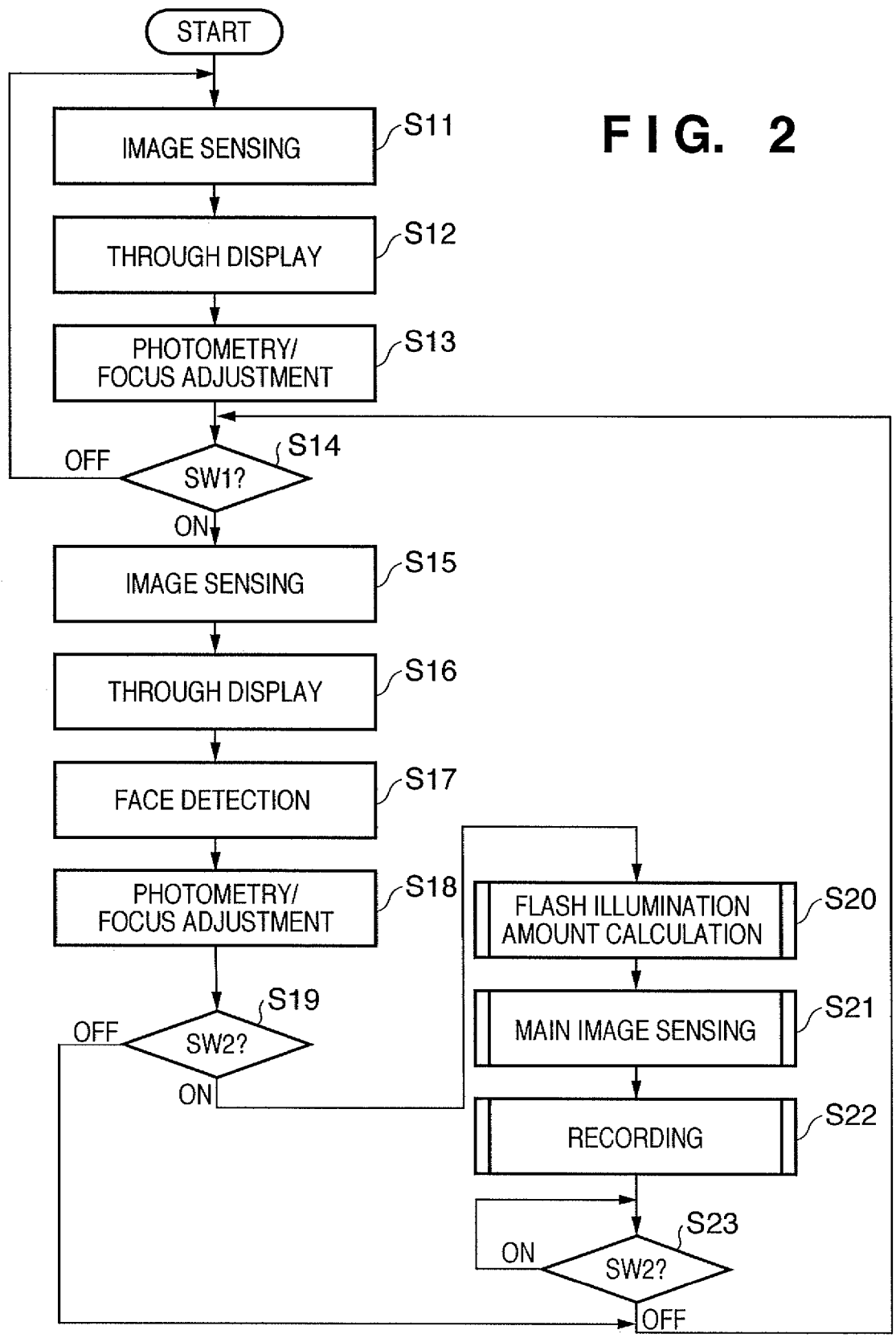
FIG. 2 is a flow chart illustrating an example main routine of an image sensing mode of the digital camera of the embodiments of the present invention.

FIG. 2 is a flow chart illustrating a main routine of an image sensing mode of the digital camera 100 of the present embodiment, executed when a power switch included in the operating unit 101 is turned ON and the image sensing mode is selected.

In a state in which the power switch is ON, when power is supplied to the parts that comprise the digital camera 100, the shutter included in the exposure mechanism 109a opens, allowing light to enter the image sensing element 103 through the lens 108a and the exposure mechanism 109a. In such a state, an image sensing process is carried out in step S11. Here, first, the image sensing element 103 is exposed and electrical charges accumulated for a predetermined time period by electronic shutter control are read out and output as analog image signals to the A/D converter 104. The A/D converter 104 performs sampling, gain adjustment, and A/D conversion on the analog image signals output from the image sensing element 103 and outputs the results as digital image signals to the image processor 105. The image processor 105 then performs various types of image processing on the digital image signals. The image-processed digital image signals are then stored temporarily in a memory, not shown.

Subsequently, in step S12, the digital image signals stored in the memory are read out and displayed on the display unit 107 (through-display). An electronic viewfinder (EVF) function can be achieved by thus displaying the obtained image signals in succession on the display unit 107 at a predetermined frame rate.

Together with displaying the digital image signals stored in the memory on the display unit 107, and together with carrying out a photometric process utilizing a known method and using the same image signals to obtain an exposure value, a focus adjustment process is carried out (step S13). It should be noted that there are no particular limitations on the order in which the processes of steps S12 and S13 are carried out, and therefore these may be carried out in any order or even simultaneously. Moreover, when carrying out face detection and focusing exposure and focus on the face, for example, methods like those described in JP-2003-107555-A and JP-2004-184508-A may be used.

Next, a status of the shutter button included in the operating unit 101 is checked. If the shutter button is not pressed and switch SW1 is OFF (OFF in step S14), then processing returns to step S11 and the above-described processes are repeated. It should be noted that image sensing using the exposure value obtained in step S13 is carried out in the image sensing process of step S11 when the above-described processes are repeated. At this time, the control unit 102 reads out the exposure value from the memory and controls the AE processor 109 based on the read-out exposure value. The AE processor 109 controls the exposure mechanism 109a based on the instructions from the control unit 102.

By contrast, if switch SW1 is ON, then processing proceeds to step S15 and preparation for main image sensing is carried out. First, in step S15, the same image sensing as that of step S11 is carried out using the exposure value obtained in the immediately preceding step S13, and the image subsequently obtained in step S16 is through-displayed as in step S12. In addition, in step S17, face detection from the sensed image is carried out with the face detection unit 106 and the size and position of the detected face area (face information Ia) are stored in a memory, not shown. Moreover, photometry and focus adjustment processes are carried out in step S18 according to the face information Ia obtained in step S17. In addition, depending on the results of the photometry process of step S18, if necessary a flash flag is set and setting of the flash is carried out as well. It should be noted that determining whether or not to fire the flash need not be carried out on the basis of the results of the photometry, and alternatively, for example, the flash may be set to fire in advance using the operating unit 101. In addition, ambient darkness may be sensed and the determination made automatically.

When the photometry and focus adjustment processes of step S18 end, processing proceeds to step S19 and the status of switch SW2 is determined. If switch SW2 is OFF, processing returns to step S14. If switch SW1 is ON, then the processes of steps S15 to S18 described above are repeated. It should be noted that, with a second and subsequent routines while switch SW1 is ON, the image sensing of step S15 is carried out using the exposure results (exposure value) obtained in step S18. If in step S14 it is further determined that switch SW1 is also OFF, then processing returns to step S11. By contrast, if switch SW2 is ON (NO at step S19), then processing proceeds to step S20.

In step S20, calculation of the flash illumination amount to be used in main image sensing is carried out and in step S21 a main image sensing process is executed. Detailed descriptions of the flash illumination amount calculation process of step S20 and the main image sensing process of step S21 are given later with reference to FIG. 3 and FIG. 4, respectively.

When the main image sensing process ends, processing proceeds to step S22 and the control unit 102 reads out the image data written into the memory and executes a development process that carries out various types of image processing. Further, after the image data is converted to a predetermined recording format by the recording format converter 112, a recording process is executed by the image recording unit 113 that writes the image data to a recording. medium, not shown, or to the memory (step S22). A detailed description of the recording process of step S22 is given later using FIG. 5.

When the recording process (step S22) ends, the control unit 102 determines the status of the switch SW2 (step S23) and waits for it to turn OFF. When switch SW2 does turn OFF, processing returns to step S14.

Figure 3:
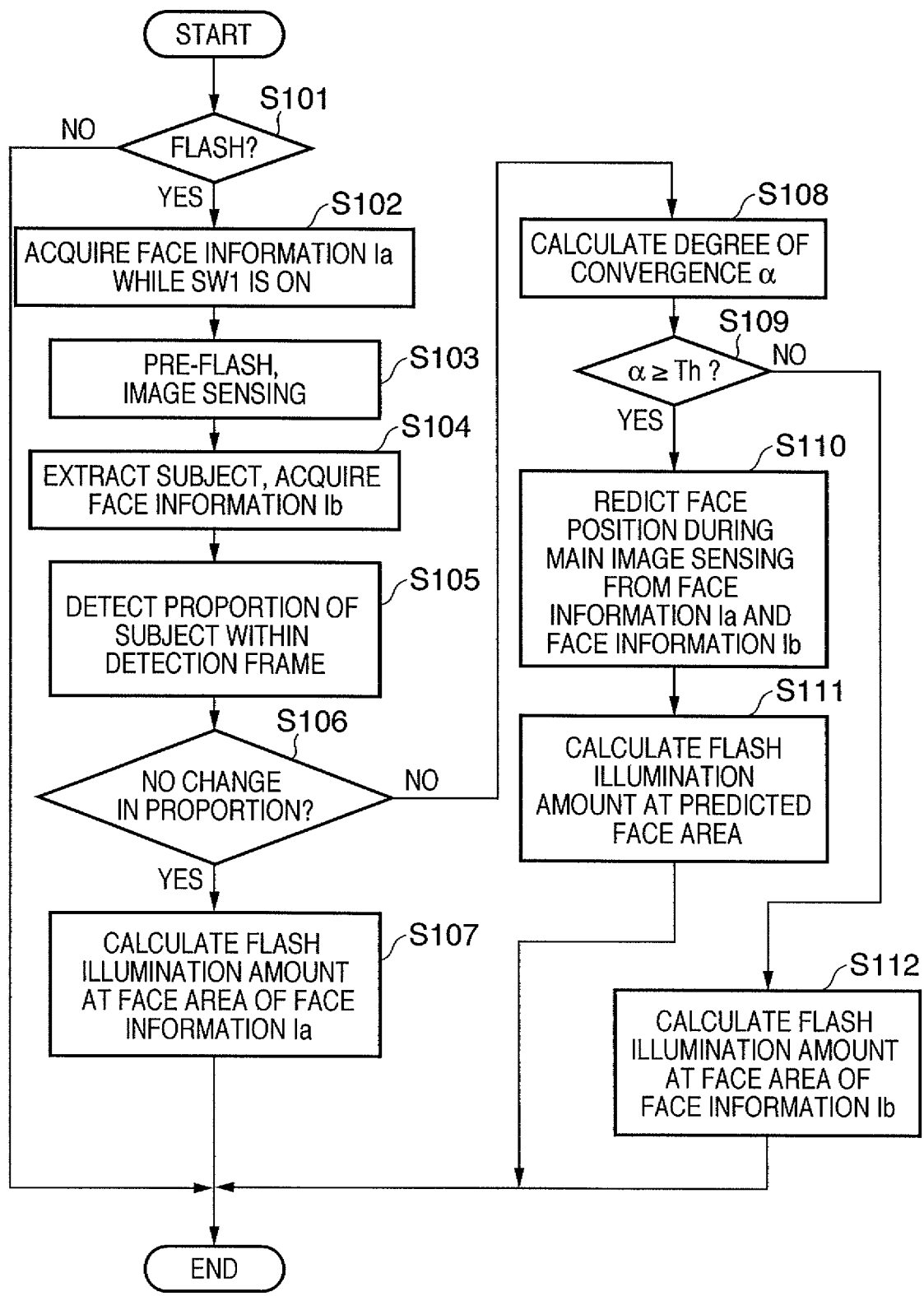
FIG. 3 is a flow chart illustrating an example flash illumination amount calculation process according to a first embodiment of the present invention.

Next, a description is given of the flash illumination amount calculation process carried out in step S20 shown in FIG. 2, with reference to the flow chart shown in FIG. 3.

First, in step S101, by investigating the flash flag it is determined whether or not flash image sensing is to be carried out. In the event that flash image sensing is not to be carried out, there is no need to obtain the flash illumination amount, and therefore this process ends as is and processing proceeds to step S21 shown in FIG. 2.

By contrast, in the event that flash image sensing is to be carried out, the face information Ia (the size and position of the face) stored in the memory, not shown, in step S17 is read out (step S102). Then, pre-flash with the flash unit 111 is carried out and an image is sensed (step S103), and the subject is extracted from the image thus obtained to acquire face area size and position (face information Ib) (step S104). It should be noted that, at this point, the subject is extracted based on reflected light data from the pre-flash, that is, an integral value. Subsequently, face information Ia and face information Ib are compared (that is, how much of the subject that is obtained as a result of extracting the subject within the area for which face information Ia is acquired is within the area) and the proportion of each subject that is within the area is obtained (step S105).

If it is determined that there is no change in the above-described proportion (given a permissible margin of error of approximately several percent) (YES at step S106), then the face area indicated by face information Ia is set as a flash illumination range, and the flash illumination amount is calculated so that this flash illumination range becomes the proper luminance (step S107). The "proper luminance" means a luminance that is not too dark and not too light. Specifically, in step S107, the flash illumination amount is calculated so that luminance of the flash illumination range falls within a preset luminance range. Hereinafter, the process of calculating the flash illumination amount to attain the "proper luminance" indicates a process of calculating a flash illumination amount such that luminance of the flash illumination falls within a preset luminance range.

If there is a change in the proportion (NO at step S106), then a degree of convergence α between the proportions is calculated (step S108). A degree of convergence α between the proportions is based on the proportion of each subject.

The obtained degree of convergence α is then compared with a threshold Th (step S109), and if the degree of convergence α is smaller than the threshold Th then the face area is deemed to have moved substantially. Subsequently, the flash illumination amount is calculated based on the face information Ib face area, which is the information obtained by flash subject extraction, without using face information Ia (step S112).

By contrast, if the degree of convergence α is equal to or greater than the threshold Th, then the face area is deemed to have not moved very much, that is, is deemed to have moved either toward or away from the photographer without moving laterally very much. Subsequently, the position of the face area during main image sensing is predicted from face information Ia and face information Ib (step S110) and the flash illumination amount is calculated so that the predicted face area attains the proper luminance (step S111). As a method of predicting the face area, the position and the size of the face area may be obtained from the amount of movement per unit of time in the position of the face area indicated by face information Ia and face information Ib, the amount of change per unit of time in the size of the face area, and the time from pre-flash to main flash.

Thus, as described above, by obtaining the flash illumination amount based on the face area in the image sensed during pre-flash and before, it becomes possible to obtain the flash illumination amount at which the face area luminance is correct even when the face area changes.

Figure 4:
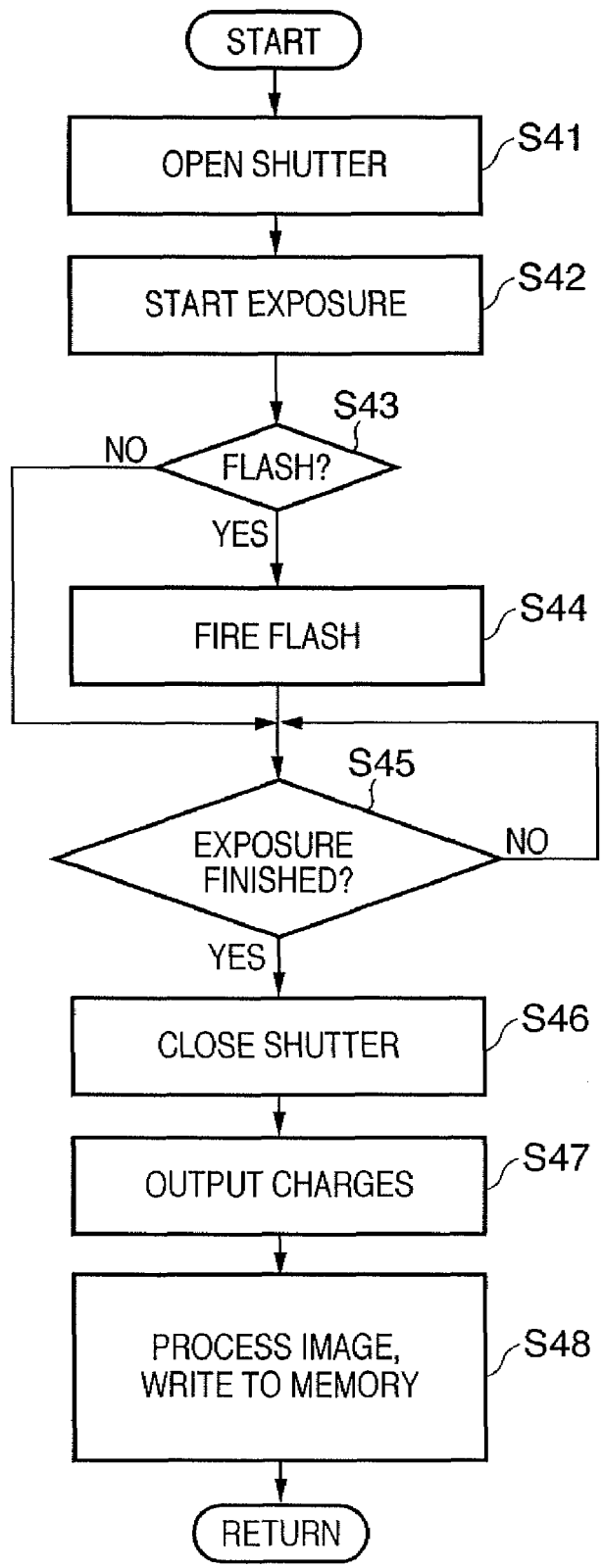
FIG. 4 is a flow chart illustrating an example main image sensing process according to the first embodiment of the present invention.

Next, a description is given of the main image sensing process carried out in step S21 shown in FIG. 2, with reference to the flow chart shown in FIG. 4.

The control unit 102 reads out the exposure value acquired in step S18 and stored in the memory, not shown, and causes the AE processor 109 to set the exposure mechanism 109a aperture to the aperture value that corresponds to the read-out exposure value and release the shutter according that aperture value (step S41). Then, exposure of the image sensing element 103 is begun (step S42). It should be noted that the image sensing element 103 is reset either just before or just after release of the shutter in order to discard unneeded electrical charges.

In step S43, a check is made to determine whether or not the flash flag is set and if the flash is required or not. When the flash is to be fired, the control unit 102 controls the EF processor 110, causing it to cause the flash unit 111 to fire at the flash illumination amount calculated in step S20 (step S44).

Next, the control unit 102 awaits the end of exposure of the image sensing element 103 in accordance with the exposure value (step S45) and causes the AE processor 109 to close the shutter of the exposure mechanism 109a (step S46). The control unit 102 then reads out the accumulated electrical charge signals from the image sensing element 103 and outputs them as analog image signals to the A/D converter 104 (step S47). The A/D converter 104 performs sampling, gain adjustment, A/D conversion and the like on the analog image signals read out from the image sensing element 103 and outputs the results as digital image signals. The image processor 105 then performs various types of image processing on the digital image signals output from the A/D converter 104 and writes the processed digital image signals to the memory, not shown (step S48). When this series of processes ends, the main image sensing routine (step S21) is finished.

Figure 5:
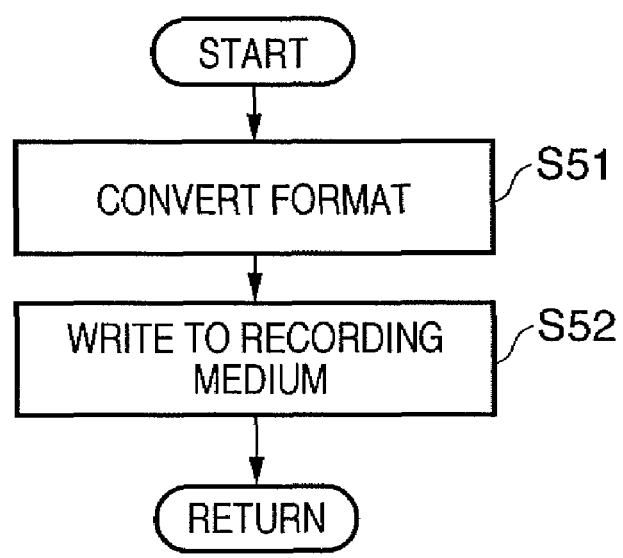
FIG. 5 is a flow chart illustrating an example recording process according to the embodiment of first the present invention.

FIG. 5 is a detailed flow chart of the recording process of step S22 shown in FIG. 2.

In step S51, the image-processed digital image signals are converted into image data of a recording format such as JPEG by the recording format converter 112 and output to the image recording unit 113. Then, the image recording unit 113 writes the recording format-converted image data to an external recording medium, not shown, such as a memory card or a CompactFlash (registered trademark) card, or to an internal recording medium (step S52). Once writing to the recording medium is finished, the recording process routine (step S22) is finished.

Figure 7:
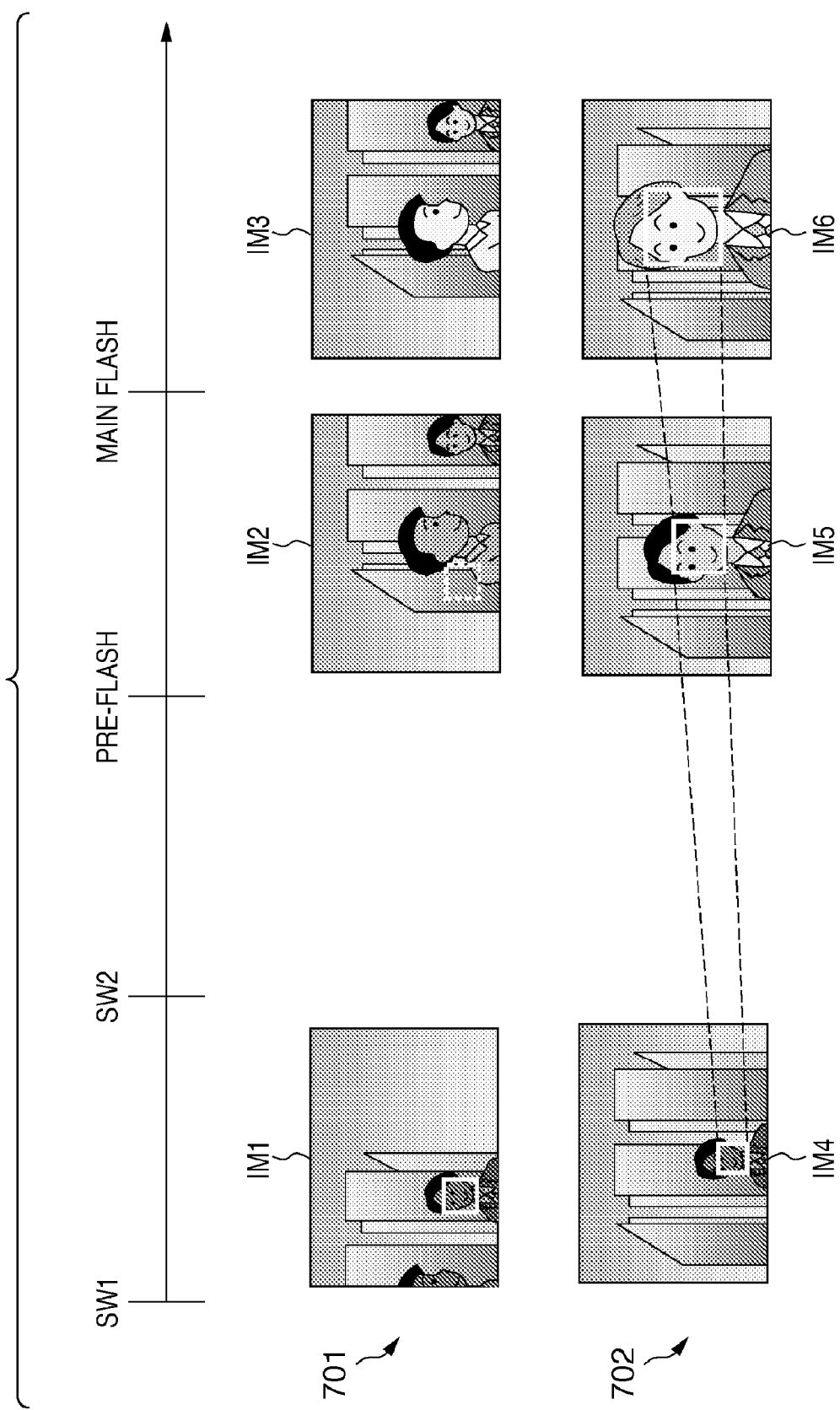
FIG. 7 shows examples of images obtained when flash illumination amount control according to the first embodiment of the present invention is carried out.

Reference numeral 701 shown in FIG. 7 shows an example of an image obtained using the flash illumination amount control of the first embodiment of the present invention, in an instance in which the image sensing angle changes during the time from when the switch SW1 is turned ON up to the time main image sensing is carried out.

First, when the switch SW1 is turned ON, a single image IM1 is sensed (step S15 in FIG. 2) and the face is detected from the sensed image IM1 (step S17). If it is found that the face detected here is dark and the brightness needs to be adjusted with the flash, then when switch SW2 is turned ON a pre-flash is carried out prior to the main flash and a second image IM2 is sensed (step S103). The subject is then extracted from the sensed image IM2 based on the reflected light data furnished by the pre-flash and face information Ib is acquired (step S104). In the example indicated by reference numeral 701 in FIG. 7, the proportion of the face area detected from IM1 that is within the detection frame and the proportion of the face area detected from IM2 at the position of the detection frame in IM1 are different (NO at step S106). In addition, from a comparison of face information Ia and face information Ib it is clear that the degree of convergence α between the two proportions is low (NO at step S109). Therefore, the flash illumination amount is calculated on the basis of the face information Ib face area, which is the information obtained from flash subject extraction (step S112). Subsequently, since the flash unit 111 is fired during main image sensing using the flash illumination amount calculated here (step S44 in FIG. 4), an image IM3 in which the face area attains the correct luminance can be obtained.

Reference numeral 702 shown in FIG. 7 shows an example of an image obtained by flash illumination amount control in the first embodiment of the present invention in an instance in which the subject moves from the background to the foreground during the time from when the switch SW1 is turned ON up to the time main image sensing is carried out.

First, when the switch SW1 is turned ON, a single image IM4 is sensed (step S15 in FIG. 2) and the face is detected from the sensed image IM4 (step S17). If it is found that the face detected here is dark and the brightness needs to be adjusted with the flash, then when switch SW2 is turned ON a pre-flash is carried out prior to the main flash and a second image IM5 is sensed (step S103). The subject is then extracted from the sensed image IM5 based on the reflected light data furnished by the pre-flash and face information Ib is acquired (step S104). In the example indicated by reference numeral 702 in FIG. 7, the proportion of the face area detected from IM4 that is within the detection frame and the proportion of the face area detected from IM5 at the position of the detection frame in IM4 are different (NO at step S106). However, in this case the two face areas are detected at substantially the same position, and thus the degree of convergence α between the two proportions is high (YES at step S109), and the face area during main image sensing is predicted on the basis of the face information Ia obtained from image IM4 and the face information Ib obtained from image IM5 (step S100). The flash illumination amount is then calculated based on the predicted face area (step S111). Since the flash unit 111 is fired during main image sensing using the flash illumination amount calculated here (step S44 in FIG. 4), an image IM6 in which the face area attains the correct luminance can be obtained.

It is noted that although in the present embodiment the subject moves from the background to the foreground, the same processing can be carried out when the subject moves from the foreground to the background.

In addition, although the image IM1 is sensed when switch SW1 is turned ON, the image may be acquired at any other time as well provided that it is acquired prior to switch SW2 turning ON.

Second Exemplary Embodiment

Next, a description is given of a second embodiment of the present invention.

Figure 6:
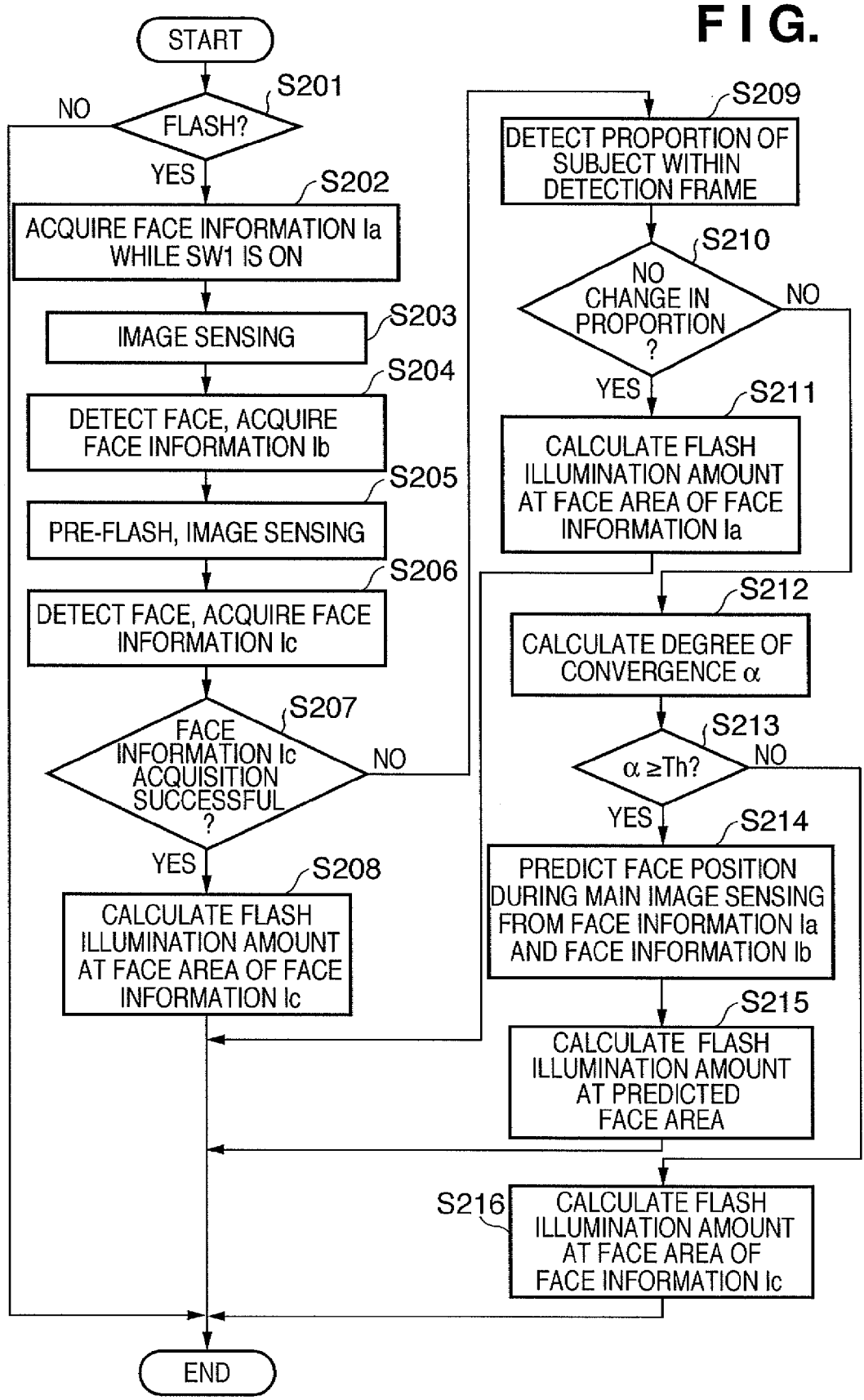
FIG. 6 is a flow chart illustrating an example flash illumination amount calculation process according to a second embodiment of the present invention.

In the second embodiment, the flash illumination amount calculation process shown in FIG. 6 is carried out instead of the flash illumination amount calculation process described with reference to FIG. 3. The rest of the processing is the same as that of the first embodiment, and therefore a description thereof is omitted here.

The difference between FIG. 6 of the second embodiment and FIG. 3 described above is that, immediately after switch SW2 is turned ON, in step S203 a single image sensing operation is carried out without using the flash and the face area is detected by the face detection unit 106 from the image thus obtained. The size and position of the face area detected here is stored in a memory, not shown. An additional point of difference is that the face area is detected from the image data obtained by image sensing with the image sensing element during pre-flash.

FIG. 6 is a flow chart illustrating the flash illumination amount calculation process carried out in step S20 shown in FIG. 2.

First, in step S201, by investigating the flash flag it is determined whether or not flash image sensing is to be carried out. In the event that flash image sensing is not to be carried out, there is no need to obtain the flash illumination amount, and therefore this process ends as is and processing proceeds to step S21 shown in FIG. 2.

By contrast, in the event that flash image sensing is to be carried out, the face information Ia (the size and position of the face) stored in the memory, not shown, in step S17 is read out (step S202). Then, image sensing is carried out without a pre-flash with the flash unit 111 (step S203), face detection carried out by the face detection unit 106 using the image thus obtained, and the size and position of the face area (face information Ib) acquired (step S204).

Next, pre-flash is carried out with the flash unit 111 and an image sensed (step S205), face detection is carried out by the face detection unit 106 using the image thus obtained, and the size and position of the face area (face information Ic) is acquired (step S206).

At this point, it is determined whether or not a face could be detected in step S206 (step S207). This determination of whether or not face detection is successful is made because, even though a face might exist, depending on the scene its detection is not always successful (due to overexposure, underexposure, and so forth).

If the face could be detected, then the face area indicated by face information Ic is set as the flash illumination area, and the flash illumination amount is calculated so that this flash illumination range becomes the proper luminance (step S208).

By contrast, if it is determined that the face could not be detected (NO at step S207), processing then proceeds to step S209. Subsequently, face information Ia and face information Ib are compared (that is, how much of the subject that is obtained as a result of extracting the subject within the area for which face information Ia is acquired is within the area) and the proportion of the subject that is within the area is obtained.

If it is determined that there is no change in the above-described proportion (given a permissible margin of error of approximately several percent) (YES at step S210), then the face area indicated by face information Ia is set as a flash illumination range and the flash illumination amount is calculated so that this flash illumination range becomes the proper luminance (step S211).

If there is a change in the proportion (NO at step S210), then a degree of convergence $\alpha$ between the proportions is calculated (step S212).

The obtained degree of convergence $\alpha$ is then compared with a threshold Th (step S213). If the degree of convergence $\alpha$ is smaller than the threshold Th then the face area is deemed to have moved substantially. Subsequently, the flash illumination amount is calculated based on the face information Ic, which is the information obtained without using flash, without using face information Ia (step S216).

By contrast, if the degree of convergence $\alpha$ is equal to or greater than the threshold Th, then the face area is deemed to have not moved very much, that is, is deemed to have moved either toward or away from the photographer without moving laterally very much. Subsequently, the position of the face area during main image sensing is predicted from face information Ia and face information Ib (step S214) and the flash illumination amount calculated so that the predicted face area attains the correct luminance (step S215). As a method of predicting the face area, the position and the size of the face area may be obtained from the amount of movement per unit of time in the position of the face area indicated by face information Ia and face information Ib, the amount of change per unit of time in the size of the face area, and the time from pre-flash to main flash.

Thus, as described above, in the second embodiment of the present invention the flash illumination amount is obtained on the basis of the face area of the image sensed when switch SW1 is ON, the face area of the image sensed when SW2 is ON without using the pre-flash, and the face area of the face area of the image sensed with the pre-flash. This arrangement, in addition to achieving the same effect as provided by the first embodiment of the present invention described above, also further enables obtaining from the image obtained with the pre-flash the flash illumination amount at which the luminance of the face area is correct even when detection of the face area fails due to, for example, overexposure.

Figure 8:
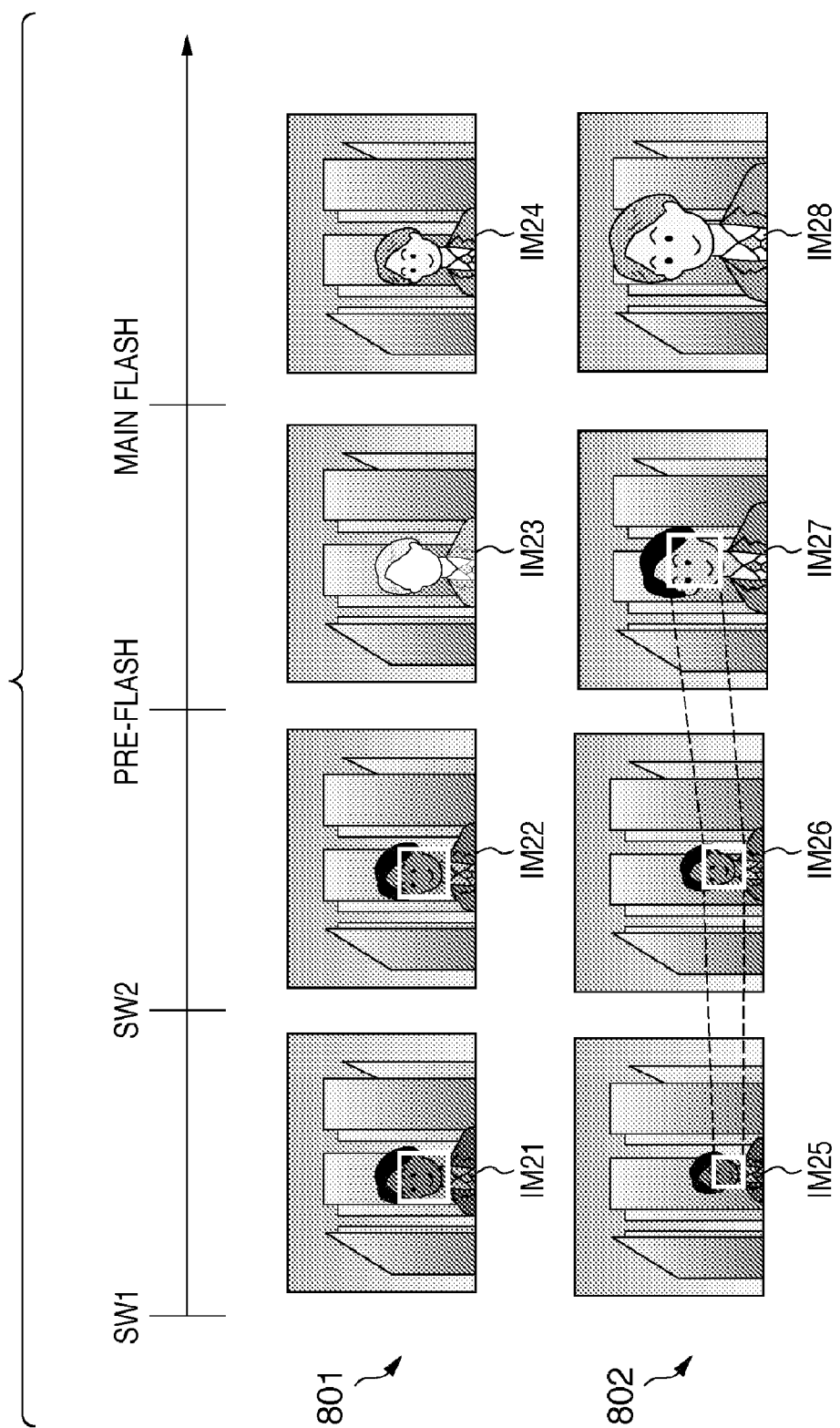
FIG. 8 shows examples of images obtained when flash illumination amount control according the second embodiment of the present invention is carried out.
Figure 9:
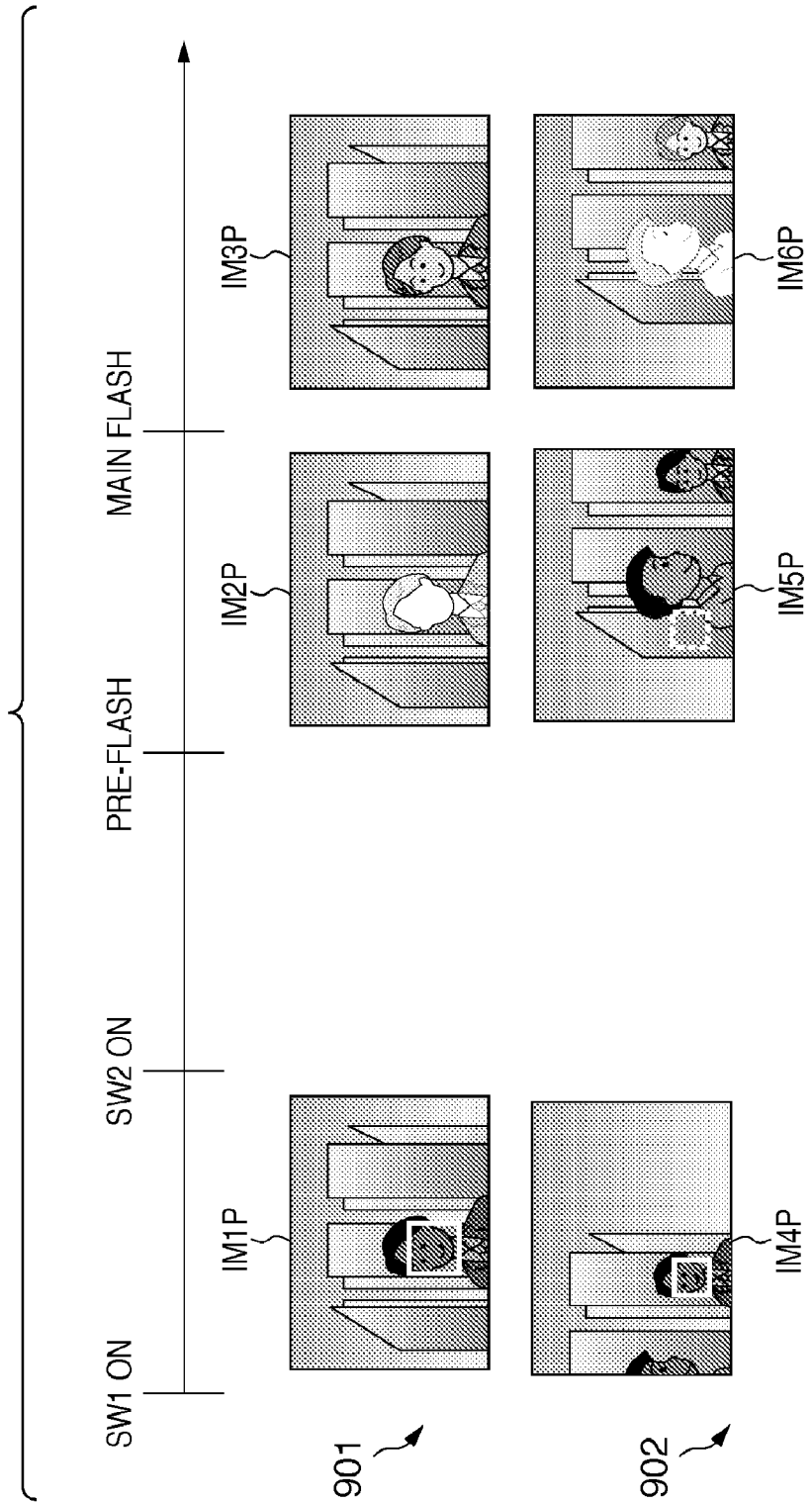
FIG. 9 is a schematic diagram illustrating problems with the conventional exposure control using face detection.

Reference numeral 801 shown in FIG. 8 shows an example of an image obtained with the flash illumination amount control of the second embodiment of the present invention, in an instance in which the face of an image obtained with pre-flash is overexposed and face detection has failed.

First, when switch SW1 is turned ON, a single image IM21 (step S15 in FIG. 2) and the face is detected from the sensed image IM21 (step S17). If it is found that the face detected here is dark and the brightness needs to be adjusted with the flash, then when the switch SW2 is turned ON a second image IM22 is sensed prior to the main flash without using a pre-flash (step S203), and the face is detected from the sensed image IM22 (step S204). Further, a pre-flash is carried out and a third image IM23 is sensed (step S205), and from the sensed image IM23 the face is detected (step S206). If at this point the face cannot be detected due to overexposure or the like (NO at step S207), a comparison is made of the proportion of the face area detected from IM21 that is within the detection frame and the proportion of the face area detected from IM22 at the position of the detection frame in IM21.

In the example indicated by reference numeral 801 in FIG. 8, the proportion of the face area detected from IM21 that is within the detection frame and the proportion of the face area detected from IM22 at the position of the detection frame in IM21 does not change (NO at step S210). Therefore, the flash illumination amount is calculated based on the face area detected from image IM21 (step S211). Subsequently, since during main image sensing the flash unit 111 is fired using the flash illumination amount calculated here (step S44 in FIG. 4), an image IM24 in which the face area attains the proper luminance can be obtained.

Reference numeral 802 in FIG. 2 shows an example of an image obtained with the flash illumination amount control of the second embodiment of the present invention in an instance in which the subject moves from the background to the foreground during the time from when switch SW1 is turned ON up to the time main image sensing is carried out.

First, when the switch SW1 is turned ON, a single image IM25 is sensed (step S15 in FIG. 2) and the face is detected from the sensed image IM1 (step S17). If it is found that the face detected here is dark and the brightness needs to be adjusted with the flash, then when the switch SW2 is turned ON a second image IM26 is sensed prior to the main flash without using a pre-flash (step S203). Then, the face is detected from the sensed image IM26 and face information Ib is acquired (step S204). Further, pre-flash is carried out and a third image IM27 is sensed (step S205), and from the sensed image IM27 the face is detected (step S206). Reference numeral 802 in FIG. 8 shows an example in which the face area could not be detected from image IM27 at this point (NO at step S207).

In the example indicated by reference numeral 802 in FIG. 8, the proportion of the face area detected from IM25 that is within the detection frame and the proportion of the face area detected from IM26 at the position of the detection frame in IM25 are different (NO at step S210). However, in this case the two face areas are detected at substantially the same position, and thus the degree of convergence α between the two proportions is high (YES at step S213), and the face area during main image sensing is predicted on the basis of the face information Ia obtained from image IM25 and the face information Ib obtained from image IM26 (step S214).

The flash illumination amount is then calculated based on the predicted face area (step S215). Since the flash unit 111 is fired during main image sensing using the flash illumination amount calculated here (step S44 in FIG. 4), an image IM28 in which the face area attains the proper luminance can be obtained.

It is be noted that although in the present embodiment the subject moves from the background to the foreground, the same processing could be carried out if the subject were to move from the foreground to the background.

In addition, although the image IM1 is sensed when switch SW1 is turned ON, the image may be acquired at any other time as well provided that it is acquired prior to switch SW2 turning ON.

Although the first and second embodiments of the present invention have been described as above with reference to the drawings, specific configurations thereof are not limited to these embodiments and other designs that do not exceed the scope and spirit of the present invention are included therewithin.

In addition, although the foregoing first and second embodiments are described in terms of detection of a face as the main subject, the present invention is not limited to use of the face as the main subject of detection and is applicable to anything that detects a subject that satisfies certain preset conditions.

Moreover, although the foregoing first and second embodiments are described with reference to a situation in which a single subject (face) is detected, by contrast, in the event that multiple subjects (faces) are detected, the areas of each of the subjects may be weighted based on certain preset conditions and the luminance calculated on the basis of the results of that weighting. These preset conditions may, for example, include distance from the center of the frame, the size of the subject (face), the reliability of subject (face) detection, and whether or not that which is detected is a person registered in advance. Of course, as can be appreciated by those of skill in the art, weighting may be carried out based on conditions other than those described above, or, alternatively, weighting need not be carried out at all.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-029711, filed on Feb. 8, 2007, which is hereby incorporated by reference herein in its entirety.

What is claimed is:

1. An image sensing apparatus capable of sensing an image with flashing a flash unit, comprising:
    an image sensing unit configured to sense an image and obtain image data of the image;
    a determination unit configured to determine a first region in the image where a subject that satisfies a predetermined condition exists based on image data obtained by the image sensing unit without flashing the flash unit;
    wherein the determination unit further determines a second region in the image where a subject that satisfies a predetermined condition exists based on image data obtained by the image sensing unit with flashing the flashing unit, and
    a calculation unit configured to calculate a flash illumination amount for the flash unit based on a comparison result between a first proportion that is a proportion of the subject in the first region of image data obtained by the image sensing unit without flashing the flash unit and a second proportion that is a proportion of the subject in the first region of image data obtained by the image sensing unit with flashing the flash unit,
    wherein in a case where a degree of convergence between the first proportion and the second proportion is less than a first threshold, the calculation unit calculates the flash illumination amount for the flash unit based on luminance of the second region.

2. The image sensing apparatus according to claim 1, wherein, in a case where the degree of convergence between the first proportion and the second proportion is equal to or greater than the first threshold and less than a second threshold which is larger than the first threshold, the calculation unit calculates the flash illumination amount for the flash unit based on luminance of a third region set on the basis of the first and second regions.

3. The image sensing apparatus according to claim 1, wherein, in a case where the degree of convergence between the first proportion and the second proportion is equal to or greater than the second threshold, the calculation unit calculates the flash illumination amount for the flash unit based on luminance of the first region.

4. An image sensing method capable of sensing an image with flashing a flash unit, comprising:
    a first image sensing step of sensing an image and obtaining image data of the image without flashing the flash unit;
    a second image sensing step of sensing an image and obtaining image data of the image with flashing the flash unit;
    a first determination step of determining a first region in the image where a subject that satisfies a predetermined condition exists based on the image data obtained in the first image sensing step;
    a second determination step of determining a second region in the image where a subject that satisfies a predetermined condition exists based on the image data obtained in the second image sensing step; and
    a calculation step of calculating a flash illumination amount for the flash unit based on a comparison result between a first proportion that is a proportion of the subject in the first region of the image data obtained in the first image sensing step and a second proportion that is a proportion of the subject in the first region of the image data obtained in the second image sensing step, wherein in a case where a degree of convergence between the first proportion and the second proportion is less than a first threshold, the flash illumination amount for the flash unit is calculated based on luminance of the second region in the calculation step.

5. The image sensing method according to claim 4, wherein, in a case where the degree of convergence between the first proportion and the second proportion is equal to or greater than the first threshold and less than a second threshold which is larger than the first threshold, the flash illumination amount for the flash unit is calculated based on luminance of a third region set on the basis of the first and second regions in the calculation step.

6. The image sensing apparatus according to claim 4, wherein, in a case where the degree of convergence between the first proportion and the second proportion is equal to or greater than the second threshold, the flash illumination amount for the flash unit is calculated based on luminance of the first region in the calculation step.

* * * * *